(12) United States Patent
Weksler et al.

(10) Patent No.: US 8,644,887 B1
(45) Date of Patent: Feb. 4, 2014

(54) DEVICE CALL NOTIFICATION EXTENSION

(75) Inventors: Arnold S. Weksler, Raleigh, NC (US); Rod D. Waltermann, Rougemont, NC (US); Russell Speight VanBlon, Raleigh, NC (US); Nathan J. Peterson, Durham, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/615,997

(22) Filed: Sep. 14, 2012

(51) Int. Cl.
 *H04M 1/00* (2006.01)
(52) U.S. Cl.
 USPC ......... 455/567; 455/417; 455/418; 455/421.1
(58) Field of Classification Search
 USPC ........................................ 455/567
 See application file for complete search history.

(56) References Cited

U.S. PATENT DOCUMENTS

| 8,255,006 B1* | 8/2012 | Chavez et al. | 455/567 |
| 2007/0037605 A1* | 2/2007 | Logan | 455/567 |
| 2007/0213100 A1* | 9/2007 | Osann, Jr. | 455/567 |
| 2008/0037743 A1* | 2/2008 | Bishop | 379/201.01 |
| 2009/0088221 A1* | 4/2009 | Gilbert et al. | 455/567 |
| 2010/0056226 A1* | 3/2010 | Bansal et al. | 455/567 |

\* cited by examiner

*Primary Examiner* — Kwasi Karikari
(74) *Attorney, Agent, or Firm* — Ference & Associates LLC

(57) ABSTRACT

An aspect provides a method, comprising: detecting an incoming voice call at an information handling device; detecting one or more external notification extension conditions at the information handling device; and in response to detecting one or more external notification extension conditions at the information handling device, extending a notification of the incoming voice call at the information handling device. Other aspects are described and claimed.

16 Claims, 4 Drawing Sheets

DEVICE CALL NOTIFICATION EXTENSION

BACKGROUND

Information handling devices ("devices"), for example cell phones, smart phones, tablet devices and even laptop computers, have voice call functionality. Such devices provide a notification, for example an audible ring, vibration, and/or visual notification on receipt of a call. Certain notification scenarios may conspire to frustrate the users of such devices when attempting to answer a voice call.

A common example is a missed call due to inadequate time to physically reach the phone. Certain prior attempts at extending a notification (ring) feature have been made. For example, certain devices may be programmed to extend a default notification time (number of rings) in response to detecting motion of a phone—with the apparent assumption that the user may be attempting to answer (imminent answer). Nonetheless, various use scenarios exist in which improved notification handling would be desirable.

BRIEF SUMMARY

In summary, one aspect provides a method, comprising detecting an incoming voice call at an information handling device; detecting one or more external notification extension conditions at the information handling device; and in response to detecting one or more external notification extension conditions at the information handling device, extending a notification of the incoming voice call at the information handling device.

Another aspect provides an information handling device, comprising one or more processors; and a memory in operative connection with the one or more processors that stores instructions executable by the one or more processors to perform acts comprising: detecting an incoming voice call at an information handling device; detecting one or more external notification extension conditions at the information handling device; and in response to detecting one or more external notification extension conditions at the information handling device, extending a notification of the incoming voice call at the information handling device.

A further aspect provides a program product, comprising a storage medium having program code embodied therewith, the program code comprising: computer program code configured to detect an incoming voice call at an information handling device; computer program code configured to detect one or more external notification extension conditions at the information handling device; and computer program code configured to, in response to detecting one or more external notification extension conditions at the information handling device, extend a notification of the incoming voice call at the information handling device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When a device does not provide a notification (such as a ring) long enough, a user may miss a call. A prior attempt at extending a notification feature programs an extension to a default notification time (for example, the number of rings) in response to detecting motion of a phone. However, this approach operates on the assumption that the user may be attempting to answer (imminent answer), and this is the source of the movement. Thus, in situations where the device is moving, such as when the user is walking or traveling (in a car, etc.), these various use scenarios may make it undesirable or inappropriate for notification extension.

Accordingly, an embodiment provides an intelligent mechanism for ascertaining when a notification extension at a device is most appropriate prior to providing such an extension. An embodiment leverages the physical location of the device in order to ascertain if notification extension is appropriate. An embodiment leverages user input to ascertain if notification is appropriate. Accordingly, an embodiment first detects one or more external extension conditions prior to providing for notification extension.

The illustrated example embodiments will be best understood by reference to the figures. The following description is intended only by way of example, and simply illustrates certain example embodiments.

Figure 1:
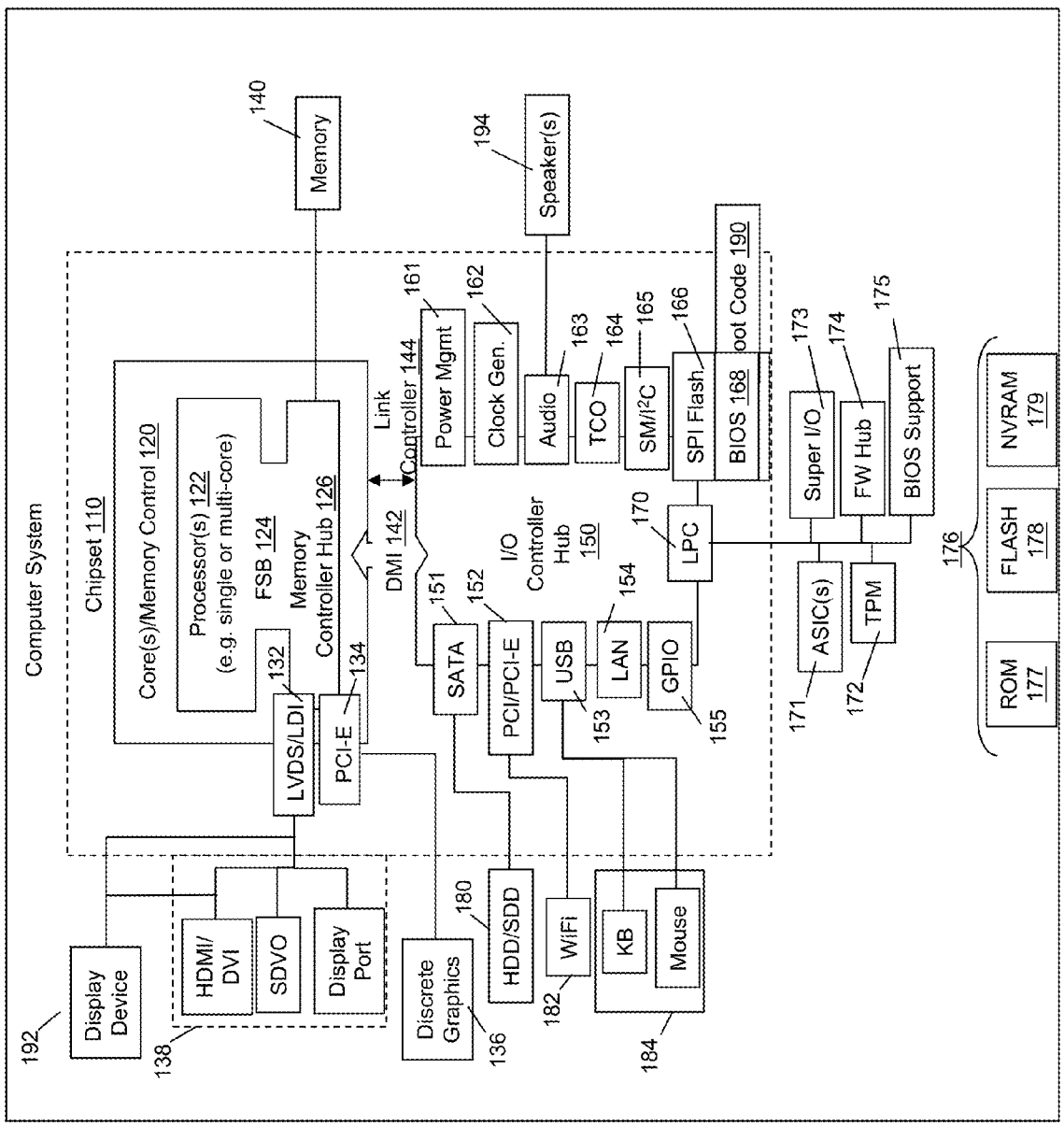
FIG. 1 illustrates an example information handling device.

While various other circuits, circuitry or components may be utilized, FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 2:
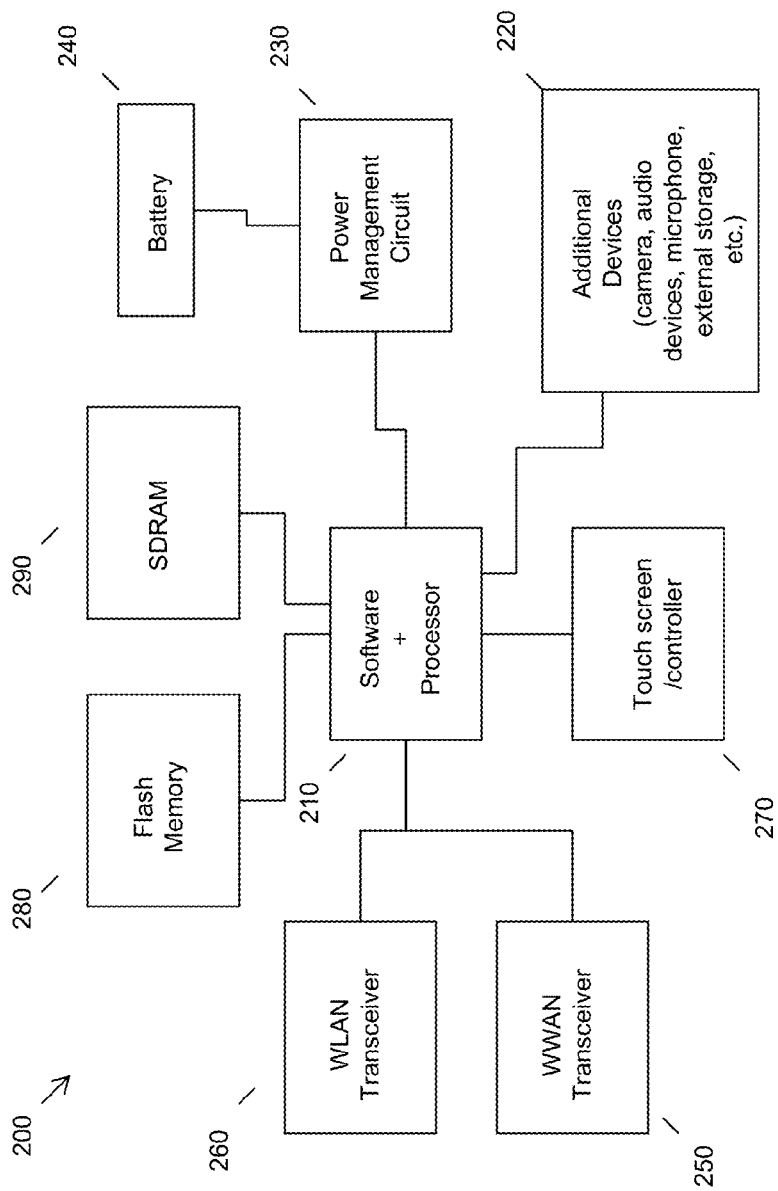
FIG. 2 illustrates another example information handling device.

For example, referring to FIG. 2, with regard to smart phone and/or tablet circuitry 200, an example includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

Figure 3:
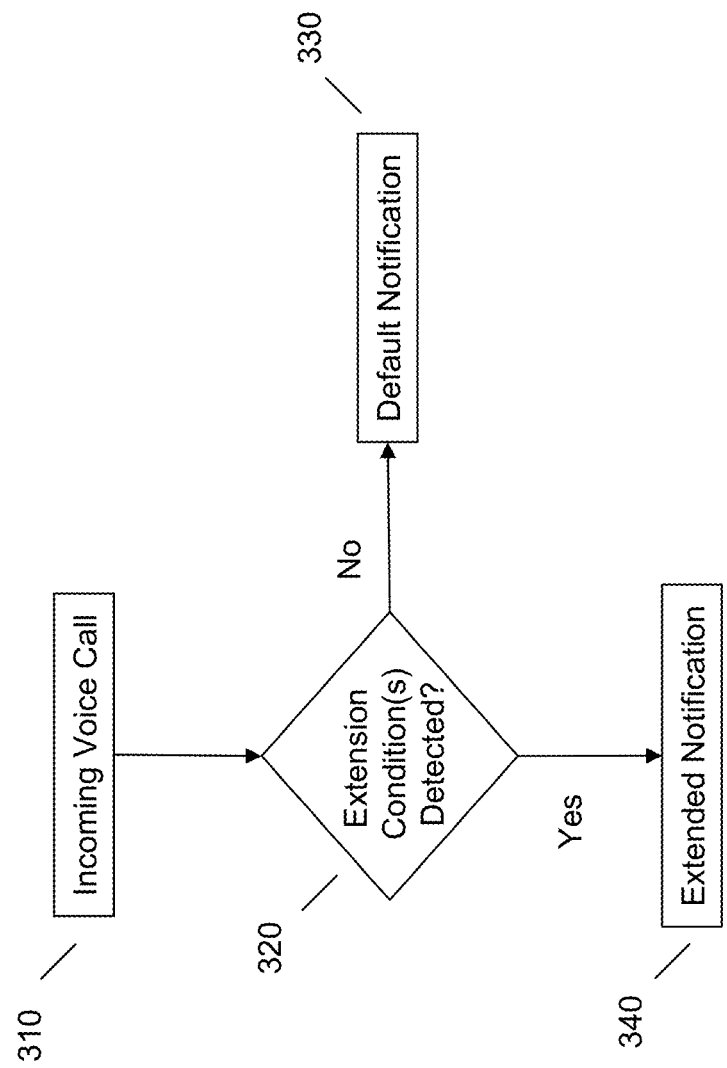
FIG. 3 illustrates an example method for notification extension.
Figure 4:
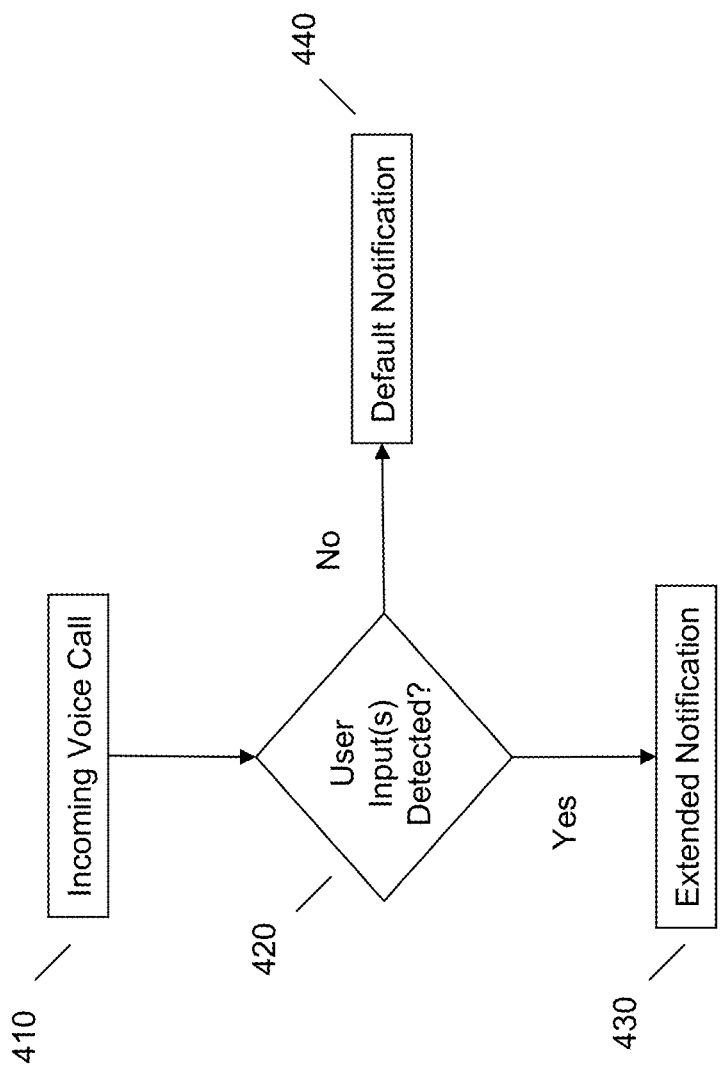
FIG. 4 illustrates another example method for notification extension.

Referring to FIG. 3, an embodiment will detect an incoming voice call 310. The incoming voice call may be in a variety of formats, for example a voice call over a wireless cellular network or a voice call placed over an Internet connection, for example according to VoIP (whether wired or wireless connection is established between the device and the network). On detecting an incoming voice call at 310, an embodiment detects if there exists one or more external notification extension conditions at 320. In this regard, an embodiment may detect one notification extension condition, may detect a combination of notification extension conditions, or may detect a combination of partial notification extension conditions that when considered together provide a complete notification extension condition, as further described herein.

If no external notification extension condition is detected 330, a default notification (for example, a default number of rings or vibrations) may be provided. Alternatively, if one or more external notification extension conditions are detected, an embodiment may extend the notification period at 340, that is, provide a notification extension. In the regard, an embodiment may add a predetermined period to the default notification, for example adding a predetermined additional number of rings or vibrations to the default notification, or may extend the notification period indefinitely (for example, permit the phone to ring or vibrate until the other caller disconnects the call or the call is answered).

An embodiment therefore detects external notification extension conditions 320 in order to extend in an intelligent fashion a notification period, thus providing a user of the device with an additional time period or opportunity in which he or she may answer the voice call. The external notification extension conditions may be based on and detected according to a variety of factors.

For example, an embodiment may provide that a particular physical location as indicative of an external notification extension condition. A particular physical location may be user defined or learned by an embodiment as a physical location indicative of a notification extension condition. For example, a user may input one or more physical locations as being extended notification condition locations. Thus, when an embodiment detects a voice call is incoming to the device, while the device is located at the physical location, the notification may be extended.

The physical location may be determined or detected in a variety of ways. For example, an embodiment may detect the physical location utilizing a global positioning satellite system (GPS) in communication with the device to ascertain the device's physical location. Additionally or alternatively, an embodiment may detect surrounding devices, such as network devices (access points, cellular towers, micro cell devices, et cetera) to detect the device's physical location.

The user may thus instruct an embodiment that when, for example, the physical location indicates that the device is at home, an external extension condition exists. Similarly, a user may provide input that when the device is paired or otherwise connected with or in communication with another known device, an external extension condition exists. In this regard, the user may instruct an embodiment to detect an external notification extension condition when a particular access point is in communication with (or otherwise detectable by) the device, when the device is paired with a particular BLUETOOTH device, or the like.

An embodiment may use multi-factor analysis in detecting external notification extension conditions, or partial external notification extension conditions. Thus, an embodiment may use more than one factor when detecting if an external notification extension condition exists. For example, an embodiment may use the physical location, device connection status, and device movement in combination to detect if a notification external extension condition exists. An example of this would be an embodiment detecting that the device is at home (physical location), the device is connected to a home access point (device connection status), and the device is not moving. If one or more of these conditions are satisfied, a notification extension condition may be detected. The user may refine which combination of factors must be detected before an embodiment detects an external notification extension condition.

An embodiment also may learn such external notification extension conditions (or refine them) by tracking user/device interactions to build up a history or pattern of behavior. Thus, an embodiment may learn appropriate external extension conditions without being instructed by a user, or use some suitable combination of instruction and learned behaviors. For example, an embodiment may track and thus learn external conditions where calls are routinely accepted or declined, and appropriately update a store of extension conditions (and factors indicative thereof). Thus, as a non-limiting example, an embodiment may ascertain a pattern wherein a user routinely accepts calls when located at home and the device is not moving. In contrast, an embodiment may ascertain a pattern wherein a user routinely declines calls when moving at a predetermined speed (such as travelling in a car) and when the user is away from home. Furthermore, an embodiment may be specifically instructed to not detect a notification extension condition when the user is at home but the device is moving. Accordingly, an embodiment may track and learn extension conditions from user/device interactions while allowing a user to maintain ultimate control thereof.

An embodiment may also detect an external extension condition by considering user input provided during an incoming call. This may be provided as a stand-alone feature or as an override to other extension condition factors. For example, an embodiment may, in response to detecting an incoming call 410, activate one or more input devices, such as a microphone. Thus, during the incoming call (the default notification period), an embodiment may detect user input 420, such as voice input, and determine if the notification period should be extended and/or some other functionality should be executed, for example picking up the call.

Accordingly, an embodiment may provide the user with the opportunity to provide one or more inputs to extend the notification period (provide a real time notification extension condition or factor) 430, otherwise a default notification may be provided 440. For example, a user may provide input for a notification extension condition by providing a voice input of "wait" or some like phrase during the default notification period. An embodiment may allow the user to instruct which voice input is to be utilized. This may avoid situations where inadvertent input (an ongoing, separate conversation, for example) provides a false positive notification extension condition. For example, an embodiment may allow a user to select from predetermined voice inputs that provide for the notification extension condition and require a match prior to extending the notification or executing other functionality. Again, this user input during the default notification period may be used alone or in combination with one or more other notification extension conditions to activate an extension notification.

Thus, an embodiment provides a notification extension that intelligently utilizes device conditions (over and above simple consultation of accelerometer inputs—which may also be used in combination with one or more aspects of the embodiments, as described herein) in order detect one or more notification external extension conditions. One or more factors such as device location, connection status, user input, device motion, and the like may be considered to form an external extension condition. Accordingly, an embodiment provides for refined determinations of when and if a notification should be extended. Thus, embodiments offer more appropriately tailored extension notifications to a user without unduly burdening the user with extended notifications in inappropriate conditions.

Embodiments may be implemented in one or more information handling devices configured appropriately to execute program instructions consistent with the functionality of the embodiments as described herein. In this regard, FIG. 1 and FIG. 2 illustrate non-limiting examples of such devices and components thereof. While mobile computing systems such as tablet computers and smart phones have been specifically mentioned as examples herein, embodiments may be implemented using other systems or devices that have a voice call functionality.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting an incoming voice call at an information handling device;
   detecting one or more external notification extension conditions at the information handling device utilizing user provided input to the information handling device during the incoming call; and
   in response to detecting one or more external notification extension conditions at the information handling device, extending a notification of the incoming voice call at the information handling device;
   wherein the external notification extension conditions comprise detecting that the information handling device is in a predetermined physical location;
   wherein the predetermined physical location of the information handling device is detected via one or more of a global positioning satellite system in communication with the information handling device and detection of a network device in communication with said information handling device ascertained via detecting that one or more network connection devices previously associated with the predetermined physical location is in communication with the information handling device.

2. The method of claim 1, wherein the external notification extension conditions comprise detecting a predetermined input to the information handling device.

3. The method of claim 1, wherein the predetermined physical location is one of a group of predetermined physical locations defined by a user.

4. The method of claim 1, wherein the predetermined physical location is one of a group of predetermined physical locations learned via consultation of a stored history of user/device interactions.

5. The method of claim 2, wherein the predetermined input is received though a microphone of the information handling device.

6. The method of claim 5, wherein the predetermined input is a voice input.

7. The method of claim 6, wherein the voice input is matched against a predetermined voice input prior to activating the notification extension at the information handling device.

8. The method of claim 1, wherein the information handling device is one of a cellular phone and a tablet computing device.

9. An information handling device, comprising:
   one or more processors; and
   a memory in operative connection with the one or more processors that stores instructions executable by the one or more processors to perform acts comprising:
   detecting an incoming voice call at an information handling device;
   detecting one or more external notification extension conditions at the information handling device utilizing user provided input to the information handling device during the incoming call; and
   in response to detecting one or more external notification extension conditions at the information handling device, extending a notification of the incoming voice call at the information handling device;
   wherein the external notification extension conditions comprise detecting that the information handling device is in a predetermined physical location;
   wherein the predetermined physical location of the information handling device is detected via one or more of a global positioning satellite system in communication with the information handling device and detection of a network device in communication with said information handling device ascertained via detecting that one or more network connection devices previously associated with the predetermined physical location is in communication with the information handling device.

10. The information handling device of claim 9, wherein the external notification extension conditions comprise detecting a predetermined input to the information handling device.

11. The information handling device of claim 9, wherein the predetermined physical location is one of a group of predetermined physical locations defined by a user.

12. The information handling device of claim 9, wherein the predetermined physical location is one of a group of predetermined physical locations learned via consultation of a stored history of user/device interactions.

13. The information handling device of claim 10, wherein the predetermined input is received through a microphone of the information handling device.

14. The information handling device of claim 13, wherein the predetermined input is a voice input.

15. The information handling device of claim 14, wherein the voice input is matched against a predetermined voice input prior to activating the notification extension at the information handling device.

16. A program product, comprising:
- a storage medium having program code embodied therewith, the program code comprising:
- computer program code configured to detect an incoming voice call at an information handling device;
- computer program code configured to detect one or more external notification extension conditions at the information handling device utilizing user provided input to the information handling device during the incoming call; and
- computer program code configured to, in response to detecting one or more external notification extension conditions at the information handling device, extend a notification of the incoming voice call at the information handling device;
- wherein the external notification extension conditions comprise detecting that the information handling device is in a predetermined physical location;
- wherein the predetermined physical location of the information handling device is detected via one or more of a global positioning satellite system in communication with the information handling device and detection of a network device in communication with said information handling device ascertained via detecting that one or more network connection devices previously associated with the predetermined physical location is in communication with the information handling device.

* * * * *